United States Patent
Aebischer et al.

[11] Patent Number: 6,106,071
[45] Date of Patent: Aug. 22, 2000

[54] TWIN FRAME SEAT ASSEMBLY

[75] Inventors: Silvio Aebischer, Grand Rapids; Neil J. Bush, Pinckney; Theodore W. Ringold, Hudsonville; Thomas J. Dellinger; Eric Burmeister, both of Zeeland; Danny E. Campbell, Holland, all of Mich.

[73] Assignee: Johnson Controls Technology Company, Plymouth, Mich.

[21] Appl. No.: 09/076,545

[22] Filed: May 12, 1998

[51] Int. Cl.⁷ ...................................................... A47C 7/02
[52] U.S. Cl. ................................. 297/452.18; 297/452.38; 297/452.55; 297/452.56
[58] Field of Search ............................ 297/452.18, 218.3, 297/354.12, 440.11, 452.12, 452.13, 452.14, 452.38, 452.48, 452.55, 452.56, 452.57, 452.58, 452.59

[56] References Cited

U.S. PATENT DOCUMENTS

| | | |
|---|---|---|
| 4,834,451 | 5/1989 | Meunier et al. . |
| 4,836,609 | 6/1989 | Hill . |
| 4,850,644 | 7/1989 | Kazaoka et al. . |
| 4,861,104 | 8/1989 | Malak . |
| 4,880,276 | 11/1989 | Shovar ................................ 297/452.55 |
| 5,015,034 | 5/1991 | Kindig et al. ....................... 297/452.56 |
| 5,050,932 | 9/1991 | Pipon et al. ........................ 297/452.18 |
| 5,067,773 | 11/1991 | Koa ..................................... 297/452.55 |
| 5,671,976 | 9/1997 | Frederick . |

FOREIGN PATENT DOCUMENTS

| | | |
|---|---|---|
| 308374A1 | 3/1989 | European Pat. Off. . |
| 372338A2 | 6/1990 | European Pat. Off. . |
| 1380470 | 3/1965 | France . |
| 2430211 | 2/1980 | France ............................ 297/452.58 |
| 19627546 | 10/1997 | Germany . |
| 29718241 | 11/1997 | Germany . |

*Primary Examiner*—Laurie K. Cranmer
*Attorney, Agent, or Firm*—Harness, Dickey & Pierce, P.L.C.

[57] ABSTRACT

A vehicle seat assembly in which the seat bottom and seat back are each constructed with a two piece frame. The two pieces of the frame attach to another and trap the trim cover and a suspension panel therebetween to support the suspension panel and trim cover on the frame with a resilient pad therebetween. The two parts of the seat bottom frame and the two parts of the seat back frame have interlocking features to fasten the parts to another without separate fasteners. The seat bottom frame parts and the seat back frame parts are also held together by a pivot pin at the rear of the seat bottom and the lower end of the seat back. The same pivot pin is used to attach the seat back and seat bottom to another. The resulting seat structure is relatively simple to dismantle. By removing the pivot pin the seat assembly will essentially "fall apart" for dismantling for reusing, reclaiming or recycling the seat components.

25 Claims, 4 Drawing Sheets

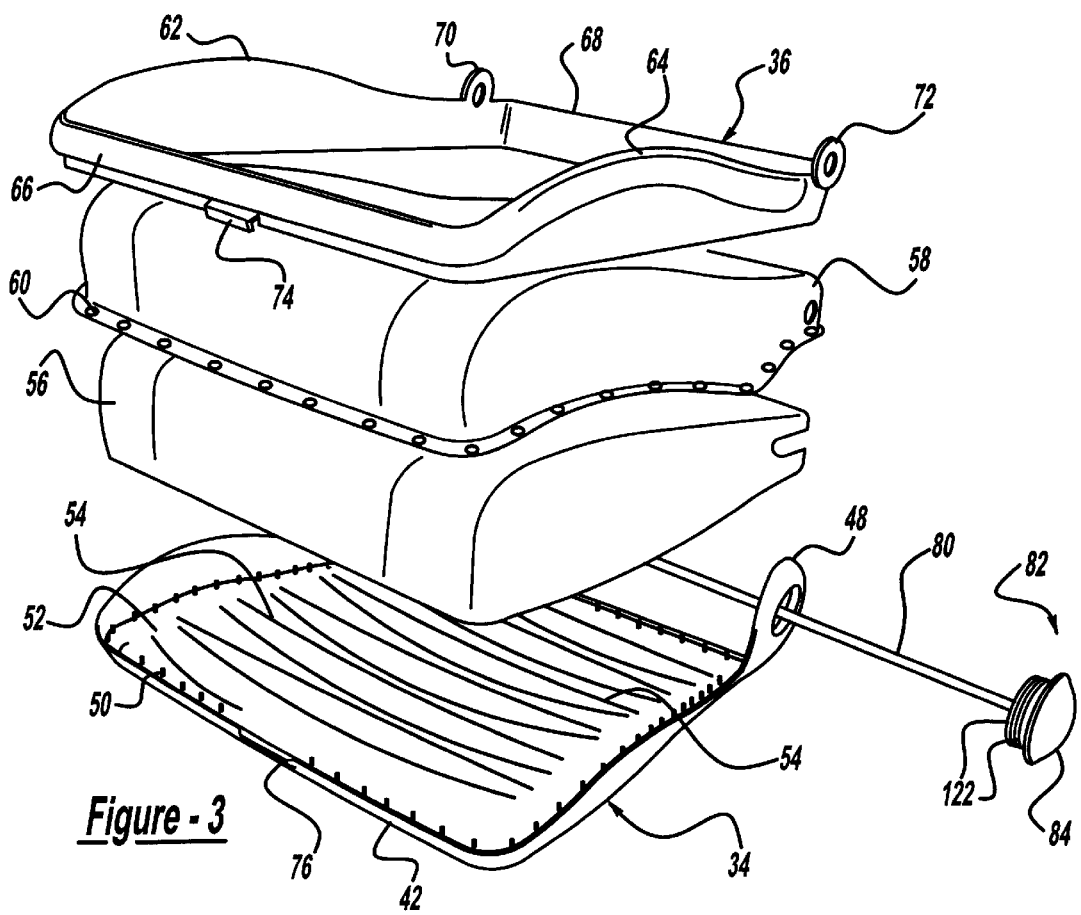
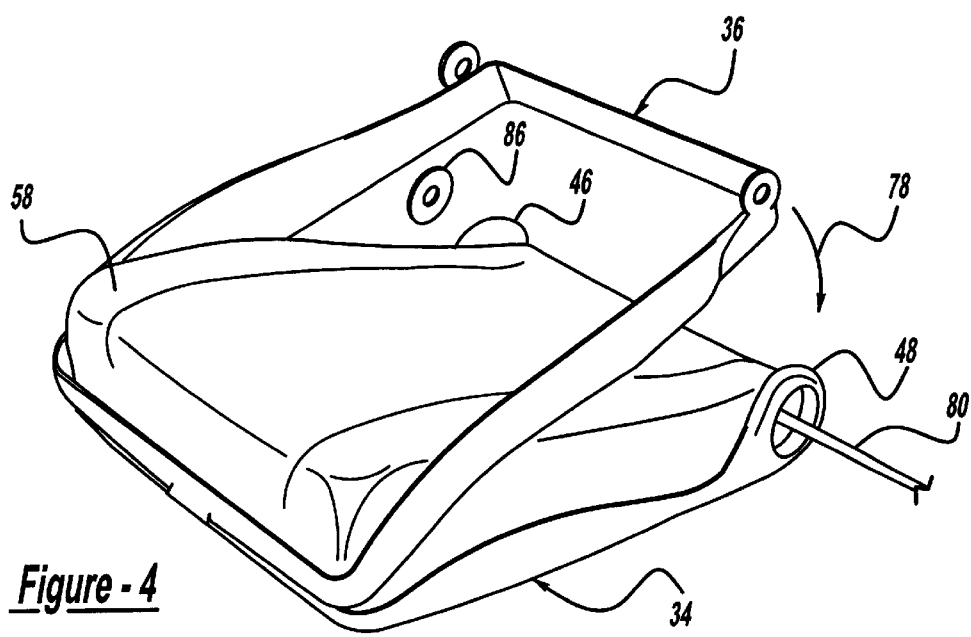

TWIN FRAME SEAT ASSEMBLY

BACKGROUND AND SUMMARY OF THE INVENTION

The present invention relates to a vehicle seat assembly constructed to facilitate recycling of the seat components after use and in particular, to a twin frame structure for a vehicle seat assembly with a minimum number of fasteners to facilitate both the assembly as well as the disassembly of the seat for reclaiming the components of the seat assembly for recycling purposes.

To reduce the negative environmental impact of motor vehicles, a greater emphasis is being placed on the recyclability of vehicle components as well as increasing the use of recycled materials in motor vehicles. In addition, an increasing number of regulations are being passed which mandate the recycled content in motor vehicles and mandate that vehicle manufacturers accept the return of a vehicle at the end of its useful life for dismantling of the vehicle and reuse or recycling of an increasingly higher percentage of the vehicle's components.

It is an object of the present invention to provide a seat structure that is designed to improve the ability to dismantle the seat assembly to reclaim or reuse the seat components. To provide more environmentally friendly vehicles, it is necessary to reduce the number of materials, components, fasteners, etc. in the seat assembly to reduce the quantity of components and the number of different materials to separate at the end of the product life cycle. Current seat frames, for example, are designed at the component level. Each component, hoop, lumbar mechanism, reclining mechanism, etc., is designed to do a particular job but only one job. There are no or few "multi-tasking" pieces that serve multiple functions. Each piece has its own fastener system. In addition, the individual pieces may be made of several different types of materials. By reducing the total number of material types, components and fasteners, dismantling of the seat assembly is made easier and therefore less costly. The less it costs to dismantle the seat assembly, the greater the economic incentive to do so.

Reuse of seat components without alteration is the best form of recycling since it eliminates energy and manufacturing costs. If a component cannot be reused in its original form, the next best form of recycling is to reclaim it. This introduces the component to a process that alters its form, making it suitable as a raw material, such as a regrinding plastic or melting metals. This is a desirable practice in that it reuses all of the material in a new component. Ideally, none of the material ends up in the landfill or incinerator.

If a seat or seat component cannot be reused or reclaimed, it is ultimately shredded. Afterwards, ferrous metals are pulled out by magnet and other materials are separated by gravity with the remainder being sent to a landfill or incinerated. With the current seat designs, the majority of the seat is sent to the shredder with the rest of the vehicle interior and ends up in a landfill as automotive shredder residue.

The seat assembly of the present invention makes significant steps toward improving the recyclability by reducing the number of components in the seat assembly. This directly facilitates the dismantling of the seat after its useful life. In addition, the number of different types of materials is also reduced to aid in the dismantling and ultimate dispersal of the individual components. The materials used in the seat assembly are preferably chosen so that materials can be easily reused or reclaimed as opposed to materials that must be shredded.

The seat assembly of the present invention is of a typical configuration having a generally horizontal seat bottom and a generally upright seat back extending upwardly at the rear of the seat bottom. A seat bottom assembly includes a frame having two parts, an upper and lower part, both of which are preferably U-shaped or rectangular. Other frame configurations may be used as desired by the seat designer. A suspension panel is attached to the lower part of the frame and spans between the frame side and cross members. A resilient pad is placed upon the suspension member and is then covered with a trim cover. The upper part of the frame is then attached to the lower part of the frame, sandwiching the periphery of the suspension panel and the trim cover therebetween to mount the suspension panel, pad and trim cover to the frame. The frame lower part and upper part are each formed as a single component and include inter-locking features that join the upper and lower frame members together. At the rear end of the two parts of the seat bottom frame, a pivot pin is used to attach the frame parts together.

The seat back is formed of a similar twin frame structure having a frame with a front part and a rear part which sandwiches the seat back suspension panel, resilient pad and trim cover therebetween. At its lower end the seat back frame is joined together by the same pivot pin joining the seat bottom frame parts. In addition, the recliner mechanism operates through the pivot pin as well such that the pivot pin also serves to mount the seat back to the seat bottom. The seat bottom frame is attached to slide tracks which are attached to a vehicle body enabling the seat bottom and seat back to be adjusted fore and aft within the motor vehicle.

The twin frame is a multi-tasking part in that it includes its own fastening features to attach the twin frame parts to one another and also to retain the suspension panel and trim cover to the frame. Thus no separate fastening components are required. The same is true of the twin frame parts in the seat back. Ideally, the frame components, if they have not been damaged during the useful life of the vehicle, i.e. involved in vehicle collision, would be reused in their original form in a new seat assembly. In a preferred embodiment of the invention, the resilient pad is made of 100% polyethylene terephthalate (PET) fiber which can be easily reclaimed as opposed to currently used polyurethane which cannot be reclaimed. The trim cover can also be made of PET cloth. Neither the trim cover nor the pad have embedded wires or Velcro fasteners that make it difficult to separate the components by material types. The trim cover is not glued to the pad either which prohibits easy removal of the trim cover. The suspension panels can be molded plastic panels made of virgin or recycled materials and can be recycled after use.

Further objects, features and advantages of the invention will become apparent from a consideration of the following description and the appended claims when taken in connection with the accompanying drawings.

BRIEF DESCRIPTION OF THE DRAWINGS

FIG. 3 is an exploded perspective view of the seat bottom showing the individual seat bottom components;

FIG. 4 is a perspective view of a partially assembled seat bottom;

DETAILED DESCRIPTION OF THE PREFERRED EMBODIMENT

Figure 1:
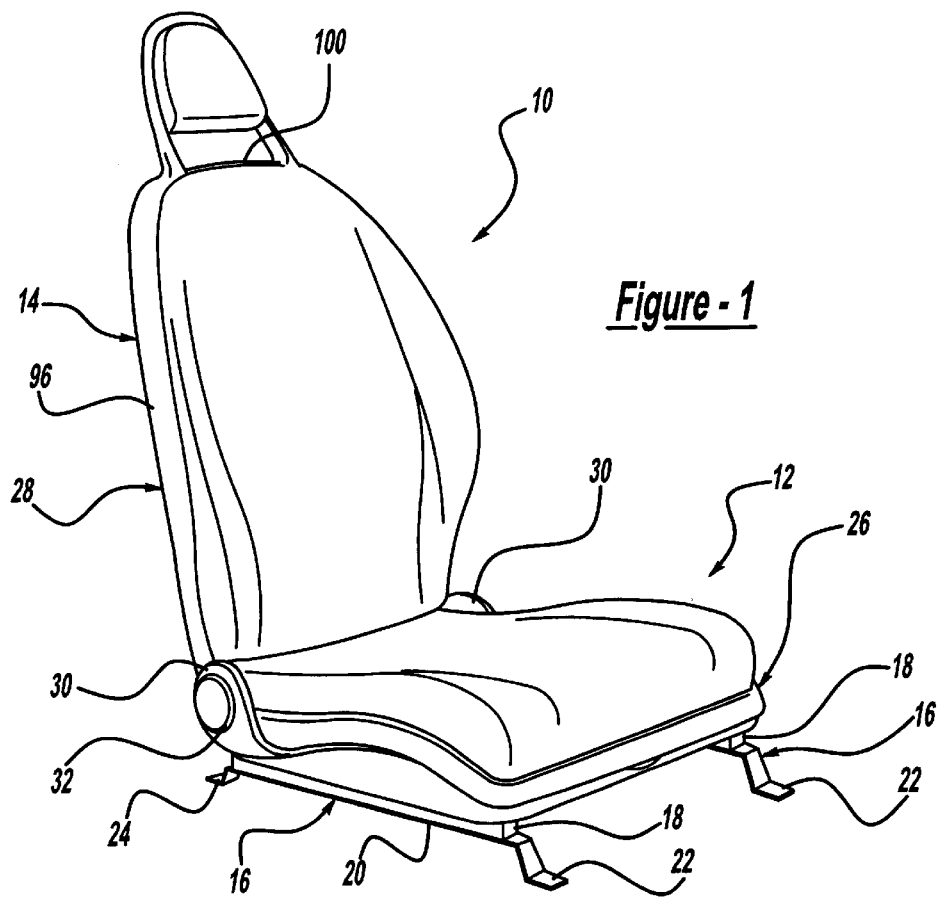
FIG. 1 is a perspective view of a vehicle seat assembly of the present invention utilizing the twin frame components in the seat bottom and seat back.

The vehicle seat assembly of the present invention as shown in FIG. 1 and designated generally at 10. The seat assembly 10 has a generally horizontal seat bottom 12 and a seat back 16 extending generally upwardly at the rear end of the seat bottom. Beneath the seat bottom 12 are a pair of left and right slide tracks 16, one on each side of the seat assembly. The slide tracks each include a sliding rail 18 and a fixed rail 20 which includes front and rear feet 22, 24 for mounting the seat assembly into a motor vehicle. The slide tracks 16 provide for fore and aft adjustment of the position of the seat bottom and seat back within a motor vehicle.

The seat bottom 12 has a frame 26 which, in the embodiment shown in FIG. 1, is an exposed frame about the periphery of the seat bottom. Likewise, the seat back includes a seat back frame 28 which is also exposed and extends about the periphery of the seat back 16. The seat back frame 28 is attached at its lower end to the rear end of the seat back frame. A knob 32 is provided to actuate a recliner mechanism at the coupling of the seat back frame to the seat bottom frame which is described below in greater detail.

Figure 2:
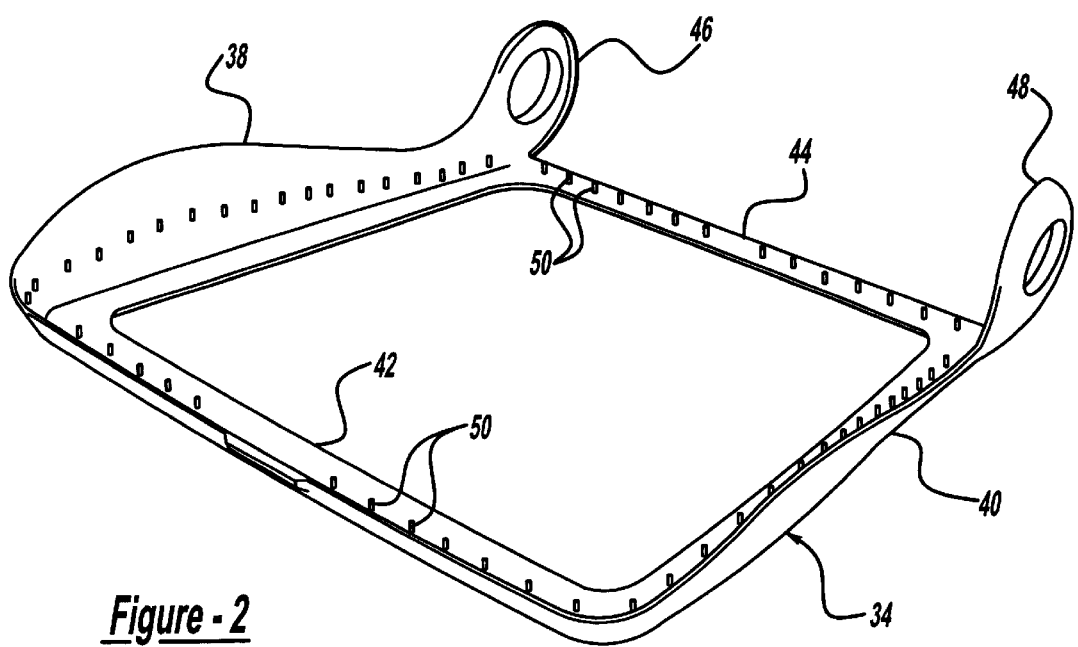
FIG. 2 is a perspective view of the lower part of the seat bottom frame.

The seat bottom and seat back each include a seating portion mounted to the frame which includes the upholstery or "soft parts" of the seat assembly engaged by a seat occupant. In the seat assembly 10 the seating portion includes a suspension panel, a resilient pad and a trim cover as shown and described in great detail in the following figures. With reference to FIGS. 2–5, the construction of the seat bottom 12 is shown. The frame 26 of the seat bottom includes a lower part 34 and an upper part 36. The lower part 34 is shown in FIG. 2 as being generally rectangular having a pair of side members 38 and 40 and front and rear cross members 42, 44. At the rear end of the bottom frame, large mounting bosses 46 and 48 are formed for multiple purposes as described below. The lower frame 34 also includes a plurality of upstanding pins 50 which are to locate and retain the suspension panel and a trim cover as described below.

As shown in FIG. 3, a suspension panel 52 is placed on the lower frame 34. The suspension panel has a plurality of apertures about its periphery which receive the upstanding pins 50 of the frame lower part. The suspension panel 52 is a semi-rigid formed panel made of any of a variety of materials including molded plastics, thermoformed fibrous bats, cast or stamped metal, etc. Resin impregnated fibrous bats are described in greater detail in patent application no. 09/076,544, filed May 13, 1998 and incorporated herein by reference. The suspension panel 52 is formed with a plurality of corrugations or ridges 54 to enable the panel to provide a flexible suspension to the seat pad. A stretchable elastic fabric panel could be used for the suspension as well.

A resilient pad 56 is placed on top of the suspension panel 52. The pad 56 is preferably made of bonded PET fibers to provide a pad that is more readily recycled than commonly used polyurethane foam pads. However, the pad can be made of polyurethane or rubberized hair or other materials.

A trim cover 58 is placed over the pad 56. The trim cover has a number of apertures 60 about its periphery which also receive the locating pins 50 of the frame lower part. The trim cover 58 is shaped to conform to the pad 56 and provide a smooth, preferably wrinkle free, surface. The trim cover is preferably made of woven PET fibers to provide ease in recycling of the trim cover material. However, any fabric, vinyl, leather, etc. materials can be used for the trim cover if desired. The seat pad 56 is sandwiched between the suspension panel and the trim cover.

The pins 50 hold the trim cover and suspension panel in place on the seat frame. These pins are only exemplary of various retaining features that could be used. The frame parts can be shaped such that the upper part forms a cam that pulls the trim cover tight as the upper part is brought down into engagement with the lower part.

The seat bottom frame upper part 36 is then placed on top of the frame lower part 34 and around the pad and trim cover. The upper frame 36, like the lower frame, has a pair of side members 62 and 64 and a pair of cross members, front cross member 66 and rear cross member 68. The upper part, like the lower part, includes bosses 70 and 72 at its rear end which will be described in greater detail below.

The upper frame part and the lower frame part have interlocking features to enable the frame parts to couple to one another. In the embodiment shown in FIGS. 1–5 the interlocking features are an extending tab 74 on the front cross member of the frame upper part and a slot 76 in the front cross member 42 of the frame lower part which receives the tab 74. The frame upper part 36 is shown in a partially assembled position in FIG. 4 in which the front cross member is lowered and the tab 74 of the front cross member is inserted into the slot 76 in the frame lower part. The rear end of the frame upper part is then rotated. This brings the bosses 70 and 72 of the frame upper part into alignment with the bosses 46 and 48 of the frame lower part where the center apertures of the bosses are aligned with one another. In the assembled position of the frame parts, the periphery of the suspension panel 52 and the periphery of the trim cover 60 are trapped between the lower and upper parts of the frame to mount the suspension panel, pad and trim cover upon the frame.

The upper and lower frame parts are held together at the rear end by a pivot pin 80 which is inserted through the mounting bosses of the upper and lower parts and which extends transversely across the rear end of the seat bottom. A recliner mechanism 82 with an operating knob 84 is attached to one end of the pivot pin. The recliner mechanism is described in greater detail below. A retainer 86 is attached to the other end of a pivot pin to hold the pivot pin in place.

The slide tracks 16 shown in FIG. 1 are attached to the bottom of the frame lower part 34.

Figure 5:
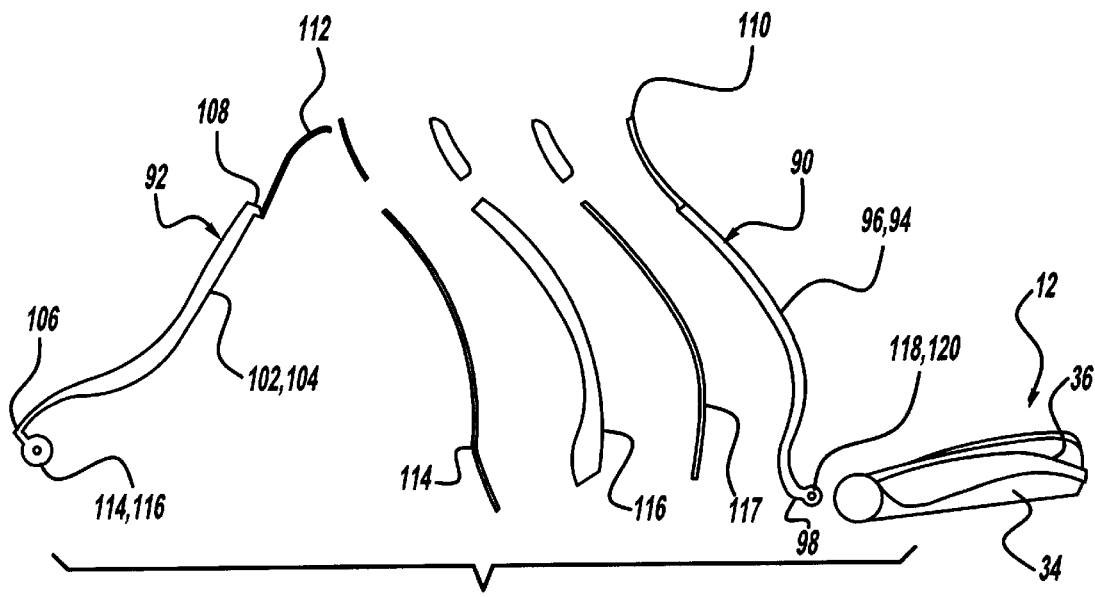
FIG. 5 is a perspective view of the seat assembly showing the seat bottom nearly fully assembled while the seat back is shown in an exploded, unassembled position illustrating the components of the seat back.

With reference to FIG. 5, the structure of the seat back 14 is shown in conjunction with the seat bottom. The seat back 14 is constructed in a similar fashion as the seat bottom. The seat back frame 28 includes a frame front part 90 and a frame rear part 92. The frame front part includes left and right side members 94, 96, a bottom cross member 98 and an upper cross member 100, best shown in FIG. 1. The frame rear part also includes left and right side members 102, 104, a lower cross member 106 and an upper cross member 108. Extending upwardly from the upper cross members of the back frame front and rear parts is a headrest frame 110 and 112. A suspension panel 114, pad 116 and trim cover 117, are attached to the frame rear and front parts and trapped therebetween in the same manner as in the seat bottom 12. The upper cross members 100 and 108 of the frame front and rear parts, respectively, have interlocking features such as a tab and a slot which couple to one another to hold the frame parts together at their upper ends. The frame parts are assembled together in such a manner that the head rest section 112 of the rear frame part forms the front portion of the headrest frame as assembled. The headrest section of the rear frame part is inserted into the headrest portion 110 of the front part from the rear and the two frame parts are rotated together about a transverse axis generally located at the upper cross members 100 and 108 of the frame parts. Mounting bosses 114 and 116 are provided at the lower end of the frame rear part which are aligned with mounting bosses 118 and 120 at the lower end of the frame front part 90. The pivot pin 80 is inserted through the bosses of the seat back frame to hold the two parts of the seat back frame together. The pivot pin 80 is inserted through both parts of both the seat bottom frame and the seat back frame concurrently to both attach the seat back frame parts and seat bottom frame parts together as well as to attach the seat back to the seat bottom. Thus, the pivot pin 80 performs multiple functions in the seat assembly reducing the number of components in the seat assembly.

The frame parts of the seat back and seat bottom frames are made of any material that will provide the necessary strength, keeping in mind the desirability to use material that can enable the parts to be reused without altering their form in a subsequent seat assembly. This may require the use of additional material to provide a greater strength and durability to the parts than would be necessary if they were to be used only once. However, the extra investment required to initially produce the parts can be recouped by future savings when these parts are reused. In the event the parts are not reused in their identical form, they are made of a material that can easily be reclaimed by using the material to manufacture new parts. Materials which can be readily reclaimed include most metals, including iron, aluminum and preferably, magnesium due to its high strength and low weight. However, other materials can be used for the frame, such as high strength plastics or composites plastics or fiber reinforced plastic materials. Any material that provides the necessary strength can be used with the preferred materials being those that enable the parts to be reused or at a minimum to be reclaimed and manufactured into new components.

The two part seat bottom frame and the two part back seat back frame is referred to as a twin frame structure since each frame is made of two parts. The parts have integral interlocking features such as the tab 74 and slot 76 in the seat bottom frame parts that enable the parts to be joined together without the need for separate fasteners such as bolts or rivets. This results in a reduction in the number of components in the seat assembly and also enables the frame parts to be readily separated by a disassembler without the need to cut away rivets or unthread threaded fasteners. As mentioned above, the pivot pin 80 serves multiple functions of retaining the seat bottom frame parts together, retaining the seat back frame parts together and coupling the seat back to the seat bottom. This further reduces the number of components in the seat assembly, leaving the retainer 86 at one end of the pivot pin as the only component in the seat assembly that can be classified solely as a fastener, performing only the one function. By removing the retainer 86 and withdrawing the pivot pin 80, the individual components of the seat assembly essentially fall apart.

As an alternative to a separate suspension panel mounted to the frame, the seat bottom lower frame part may include an integrally molded or cast metal pan extending across the sat bottom. This would likely not be flexible to provide a suspension but would support the seat pad.

As another alternative, the seat bottom upper frame part could be made not as a load carrying frame part but as a retainer to mount the seating portion to the lower frame part. Additionally, the upper frame part may attach to the lower frame part solely by interlocking features in the frame parts and not be retained by the pivot pin 80. In such a case, the upper frame part would not include the mounting boss for the pivot pin.

Figure 6:
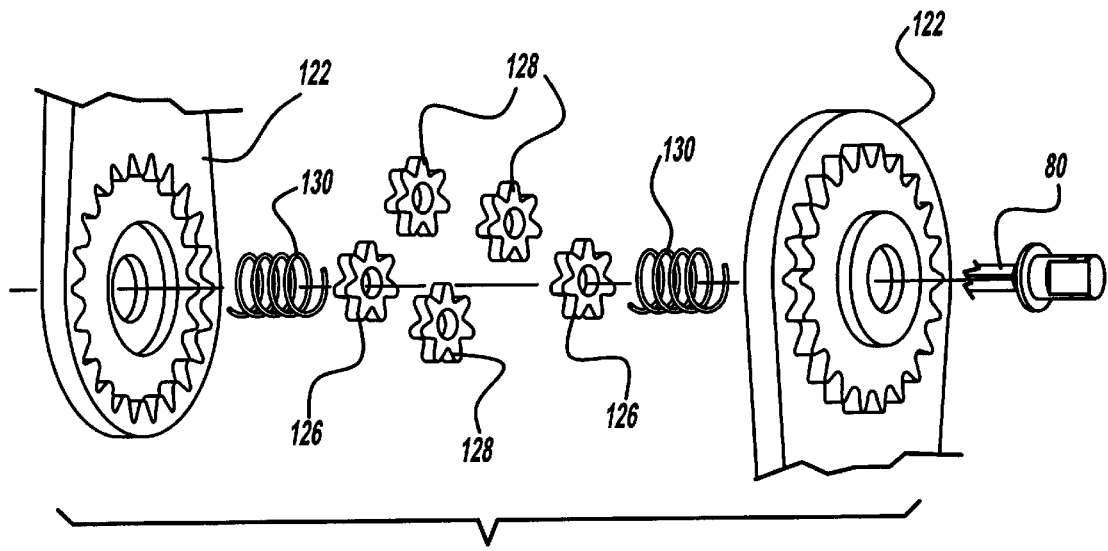
FIG. 6 is a perspective view of an exemplary recliner mechanism.

Various types of recliner mechanisms can be used, one possible mechanism utilizes a pair of ring gears 122, one of which is designed to couple non-rotatably with the seat back frame while the other is coupled non-rotatably with the seat back frame. The gears can couple to the seat back and seat bottom frames by a bayonet-type locking mechanism requiring no separate fasteners. Such a recliner mechanism is shown in FIG. 6. Between the ring gears 122 is a planetary gear configuration 124, having a pair of sun gears 126 and multiple planet gears 128. By providing the ring gears 122 with one ring gear having a different number of teeth than the other ring gear, rotation of the pivot pin 80, which is coupled to the sun gears 126, results in rotation of one ring gear relative to the other causing rotation of the seat back relative to the seat cushion about a transverse axis. Springs 130 bias the beveled sun gears tightly against the planet gears to avoid free play in the recliner. As an alternative construction, instead of having ring gears 122 which couple to the seat back and set bottom frames, one or both of the ring gears themselves may be integrally formed as part of the mounting bosses of the seat back and seat bottom frames. In this case, a planetary set would be inserted between the ring gears during the coupling of the seat back and seat bottom to one another.

In many seat assemblies, a recliner mechanism on one side of the seat assembly is adequate. Where a two sided recliner is needed, such as a structured seat carrying a shoulder belt, the pivot pin 80 can be used to transmit the rotary motion to operate the recliner on the side of the seat opposite the recliner knob. If only one recliner is used and the pivot pin 80 is not needed as a transverse cross member, the pin 80 may be replaced by two shorter pivot pins, one on each side of the seat assembly, to retain the frame parts together and to attach the back frame to the bottom frame.

Figure 7:
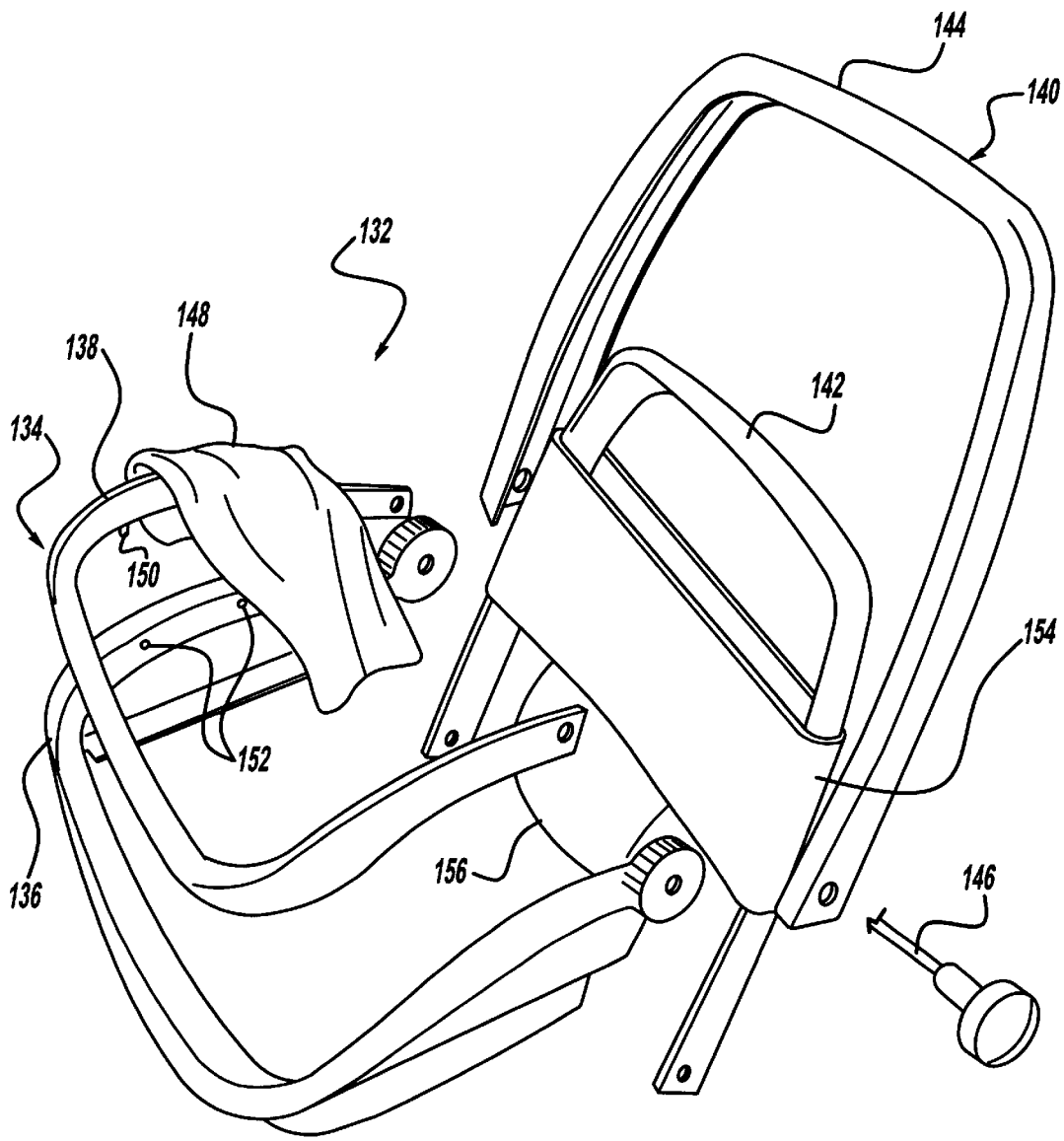
FIG. 7 is a perspective view of the frame and trim cover components of an alternative embodiment of the twin frame seat assembly of the present invention.

With reference to FIG. 7, an alternative embodiment of the twin frame seat assembly is shown. In this embodiment, the seat bottom frame 134 has a lower piece 136 and an upper piece 138. Likewise, the seat back frame 140 has a front part 142 and rear part 144. Both the seat bottom frame and seat back frame are generally U-shaped having three sides, as opposed to rectangular four sided frame parts of FIGS. 1–4. In the case of the seat bottom, the two parts each have opposite side members and a front cross member but no rear cross member. With the seat back frame, there are upright side members on each side and an upper cross member but no lower cross member. The frame parts each have mounting bosses similar to that shown in connection with the first embodiment of FIGS. 1–4 for receiving a pivot pin 146. In this embodiment, the pivot pin 146 also serves as a transverse cross member at the rear of the seat bottom and lower end of the seat back. Inward deflection of the frame side members can be prevented by providing the pivot pin 146 with an annular grove and placing a snap ring or other fastener in the grove immediately inboard of the frame parts on each side.

The seat assembly 132 also has other differences from that shown in the seat assembly 10. The seat assembly 132 does not include a suspension panel and resilient pad. Rather, trim cover 148 is made of a stretchable fabric that is attached to the seat bottom frame and spans between the two side members of the seat bottom frame. The stretchability of the trim cover 148 provides the cushioning effect for the seat occupant.

The frame part 138 is provided with nominally projecting pins 150 that can used to locate the trim cover 148. The pins 150 also seat into hole apertures 152 in the lower frame part 136. In a addition to locating the two frame parts to one another, the pins 150 can snap engage into the apertures 152 to mount the frame upper part 138 onto the lower part 136, trapping the trim cover therebetween.

The seat back trim cover 154 is shown as sleeve that fits over the front frame part 142 and is stretched tightly thereby. To provide additional lumbar support, a resilient pad 156 can be placed inside the trim cover 154 in the lumbar region. The pad 156 can be made of PET fibers or other recyclable material or it can be made of polyurethane foam if desired.

The various features of seat assemblies lot 132 can be combined with one another. For example, seat assembly 10 can be made with a three sided frame as shown in seat assembly 132.

The twin frame structure of the present invention is beneficial for the purposes of ease of assembly and ease of disassembly. By providing a seat that is easy to disassemble, there is a greater economic incentive for the seat to be dismantled and its components reused or reclaimed. However, the structure shown and claimed can be used in a seat in which the individual components are not readily reused or reclaimed. For example, while a PET fiber pad is preferred for the seat pad, a generally non reusable or reclaimable polyurethane pad can be used as well. Likewise, the trim cover can be adhesively bonded to the seat pad if desired even though this makes separation of the trim cover and seat pad impractical.

It is to be understood that the invention is not limited to the exact construction illustrated and described above, but that various changes and modifications may be made without departing from the spirit and scope of the invention as defined in the following claims.

We claim:

1. A vehicle seat assembly comprising:

a generally horizontal seat bottom and a seat back extending generally upwardly at a rear end of the seat bottom, one of the seat bottom and seat back having a frame and a seating portion for engagement with a seat occupant, the frame having a first part and a second part, the first and second parts of the frame being joined together with a part of the seating portion being trapped between the first and second parts of the frame to mount the seating portion upon the frame, and retaining mechanism positioned at the rear end of the seat bottom separate from the frame parts themselves and operable to couple the frame first and second parts to one another; wherein the retaining mechanism for coupling the frame first and second parts to one another also couples the seat bottom to the seat back.

2. The vehicle seat assembly of claim 1 wherein the seating portion includes a suspension panel, a pad and a trim cover.

3. The vehicle seat assembly of claim 2 wherein the suspension panel and the trim cover surround the pad and wherein peripheral edges of the suspension panel and the trim cover are retained between the first and second parts of the frame to mount the seating portion upon the frame.

4. The vehicle seat assembly of claim 1 wherein the seating portion includes a flexible sheet material spanning between opposite sides of the frame.

5. The vehicle seat assembly of claim 1 wherein the seating portion includes a resilient pad for cushioning.

6. The vehicle seat assembly of claim 1 wherein the frame has spaced apart side members on opposite sides of the one of the seat bottom and seat back and the seating portion spans between the spaced apart frame side members.

7. The vehicle seat assembly of claim 6 wherein the frame further comprises a cross member connecting the two side members together at one end of the side members forming a generally U-shaped frame.

8. The vehicle seat assembly of claim 6 wherein the frame further comprises spaced cross members connecting the two side members together at each end of the side members forming a generally rectangular shaped frame.

9. The vehicle seat assembly of claim 6 wherein the seating portion includes a suspension panel spanning between the two spaced apart side members of the frame.

10. The vehicle seat assembly of claim 1 wherein the frame first part is integrally formed as a single piece.

11. The vehicle seat assembly of claim 1 wherein the frame second part is integrally formed as a single piece.

12. The vehicle seat assembly of claim 1 wherein the frame first and second parts are each integrally formed as single pieces and wherein the frame first and second parts include integrally formed means for interlocking the first and second parts to one another at one end of the frame.

13. The vehicle seat assembly of claim 1 wherein the retaining mechanism includes a pivot pin extending transversely across the seat assembly.

14. The vehicle seat assembly of claim 13 further comprising recliner means associated with the pivot pin and coupled to each of the seat back and seat bottom to rotatably adjust the position of the seat back relative to the seat bottom and to hold the seat back in place relative to the seat bottom.

15. A vehicle seat assembly comprising:

a generally horizontal seat bottom and a seat back extending generally upwardly at a rear end of the seat bottom, one of the seat bottom and seat back having a frame and a seating portion for engagement with a seat occupant, the frame having a first part and a second part, the first and second parts of the frame being joined together with a part of the seating portion being trapped between the first and second parts of the frame to mount the seating portion upon the frame; and retaining means at the rear end of the seat bottom for coupling the first and second frame parts of the one of the seat bottom and the seat back to one another and also for coupling the seat bottom to the seat back, wherein the retaining means for coupling the first and second frame parts of the one of the seat bottom and the seat back to one another and also for coupling the seat bottom to the seat back includes a pivot pin extending transversely across at least a portion of the seat assembly.

16. The vehicle seat assembly of claim 15 further comprising recliner means associated with the pivot pin and coupled to each of the seat back and seat bottom to rotatably adjust the position of the seat back relative to the seat bottom and to hold the seat back in place relative to the seat bottom.

17. The vehicle seat assembly of claim 15 wherein the frame has side members extending along opposite sides of the frame which terminate at one end of the frame in mounting bosses on each side having aligned apertures therein for receiving a pivot pin therein which extends transversely across the seat assembly.

18. The vehicle seat assembly of claim 15 wherein the frame first part is a load carrying member to carry the seating load and the frame second part is joined to the first part to retain the seating portion to the frame between the frame first and second parts.

19. A vehicle seat assembly comprising:

a generally horizontal seat bottom;

a seat back extending generally upwardly at a rear end of the seat bottom; and the seat bottom having a frame and a seating portion for engagement with a seat occupant, the frame having a first part and a second part each having a pair of spaced apart side members having retaining means at a rear end thereof for coupling the first and the second parts of the frame to one another, and a front cross member having means for interlocking the first and the second parts of the frame to one another, the first and second parts of the frame being joined together with a part of the seating portion being trapped between the first and second parts of the frame to mount the seating portion upon the frame.

20. The seat assembly of claim 19 wherein the retaining means at a rear end of the frame side members includes a pivot pin.

21. The seat assembly of claim 19 wherein the retaining means at a rear end of the frame side members couples the seat back to the seat bottom frame.

22. The seat assembly of claim 19 wherein the seat back has a back frame and a back seating portion for engagement with a seat occupant, the back frame having a first part and a second part each having a pair of spaced apart side members and an upper cross member, the first and second parts of the back frame being joined together with a part of the back seating portion being trapped between the first and second parts of the back frame to mount the seating portion upon the frame, and wherein the retaining which couples the seat bottom frame parts to one another also couples the seat back frame parts to one another and couples the seat back frame to the seat bottom frame.

23. A vehicle seat assembly comprising:

a generally horizontal seat bottom;

a seat back extending generally upwardly at a rear end of the seat bottom; and the seat back having a frame and a seating portion for engagement with a seat occupant, the frame having a first part and a second part each having a pair of spaced apart side members having retaining means at a lower end thereof for coupling the first and the second parts of the frame to one another, and an upper cross member, the retaining means coupling the seat back frame to the seat bottom, the first and second parts of the frame being joined together with a part of the seating portion being trapped between the first and second parts of the frame to mount the seating portion upon the frame.

24. The seat assembly of claim 23 wherein the frame parts are integrally formed with means at the upper cross members for interlocking the frame first and second parts to one another.

25. A vehicle seat assembly comprising:

a generally horizontal seat bottom;

a seat back extending generally upwardly at a rear end of the seat bottom; and one of the seat bottom and seat back having a frame and a seating portion for engagement with a seat occupant, the frame having a first part and a second part, the first and second parts of the frame being joined together with a part of the seating portion being trapped between the first and second parts of the frame to mount the seating portion upon the frame the frame further having side members extending along opposite sides of the frame which terminate at one end of the frame in mounting bosses on each side having aligned apertures therein for receiving a pivot pin therein which extends transversely across the seat assembly.

\* \* \* \* \*

UNITED STATES PATENT AND TRADEMARK OFFICE
CERTIFICATE OF CORRECTION

PATENT NO. : 6,106,071
DATED : August 22, 2000
INVENTOR(S) : Aebischer et al.

It is certified that error appears in the above-identified patent and that said Letters Patent is hereby corrected as shown below:

<u>Title page,</u>
Item [75] Inventors, please change "Theodore W. Ringold" to -- Ted W. Ringold --.

Signed and Sealed this

Sixteenth Day of October, 2001

Attest:

*Nicholas P. Godici*

NICHOLAS P. GODICI
*Attesting Officer*   *Acting Director of the United States Patent and Trademark Office*